United States Patent

Hajduk

[15] 3,675,955

[45] July 11, 1972

[54] CABINET BRACKET

[72] Inventor: Frank R. Hajduk, Lincoln Park, Mich.

[73] Assignee: Regis Manufacturing Company

[22] Filed: March 23, 1970

[21] Appl. No.: 21,731

[52] U.S. Cl..........................287/20.927, 217/12, 292/340, 312/111, 312/257 R
[51] Int. Cl..........................................................G09f 7/00
[58] Field of Search..............287/20.92 T, 20.924, 20.925, 287/20.926, 20.927, 20.92 C; 217/12, 43; 312/111, 257 R, 263; 108/152, 153; 292/340; 33/197, 180 R

[56] References Cited

UNITED STATES PATENTS

| 3,403,641 | 10/1968 | Baker | 287/20.925 X |
| 1,571,601 | 2/1926 | Richards | 287/20.924 X |
| 2,879,561 | 3/1959 | Rieder | 287/20.927 |
| 3,003,839 | 10/1961 | Bloom et al | 312/111 |
| 3,490,797 | 1/1970 | Platte | 287/20.924 |
| 2,526,539 | 10/1950 | Carroll | 292/340 X |

Primary Examiner—David J. Williamowsky
Assistant Examiner—Wayne L. Shedd
Attorney—Harness, Dickey & Pierce

[57] ABSTRACT

A cabinet assembly of the knockdown type embodying male and female brackets mounted contiguous to peripheral edges of members for affixing the members together in a snap together manner. A method and structure for locating the brackets relative to the respective members in preselected locations is employed. Additionally, the brackets embody improved resilient fingers for holding the brackets and members in an interlocked condition.

5 Claims, 7 Drawing Figures

PATENTED JUL 11 1972 3,675,955

INVENTOR.
Frank R. Hajduk
BY
Harness, Dickey & Pierce
ATTORNEYS

PATENTED JUL 11 1972

INVENTOR
Frank R. Hajduk

BY Harness, Dickey & Pierce
ATTORNEYS

CABINET BRACKET

CROSS-REFERENCE TO RELATED APPLICATION

This application is related to United States Letters Pat. No. 3,403,641, entitled Brackets for Assembling Knockdown Cabinets, issued Oct. 1, 1968 in the name of Harold L. Baker and Ser. No. 21,730 filed concurrently herewith in the name of Frank R. Hajduk.

BACKGROUND OF THE INVENTION

This invention relates to an improved bracket for use in securing a pair of members together and more particularly to an improved bracket for use in assembling prefabricated cabinets or the like.

In the aforenoted patent, an arrangement is disclosed for assembling knockdown cabinets or the like. This arrangement embodies male and female brackets that are affixed respectively, to two members that are to be assembled and contiguous to the edge of at least one of the members. When the members are brought into abutting relationship, the brackets will snap together and rigidly affix the members together. This arrangement is highly desirable in that it permits the structural members and brackets to be shipped to an assembly site in a knocked-down fashion. The brackets may then be affixed to members and the members connected together by means of the affixed brackets. In the bracket employed in that application, a positive limit stop was defined for limiting the separating movement of the two bracket elements and a resilient finger was provided for urging the brackets in this direction against the limit stop. The resilient finger shown in that application was subject to possible permanent deformation decreasing its effectiveness. In addition, it is highly important that the bracket be capable of accurate location relative to its respective member for insuring accurate positioning during assembly. The bracket shown in that patent application afforded no means for insuring such accurate location.

It is, therefore, a principle object of this invention to provide an improved bracket for assembling a pair of members together.

It is another object of the invention to provide an improved bracket for assembling members together incorporating resilient fingers that are not subject to damage.

It is a further object of the invention to provide an improved bracket for assembling members together incorporating a locating means for locating the bracket relative to the member before assembly thereto.

It is yet another object of the invention to provide a bracket locating means that prevents inadvertent reversal of male and female brackets.

SUMMARY OF THE INVENTION

This invention is adapted to be embodied in bracket means for interconnecting first and second members. The bracket means comprises a male bracket having a first portion securable to one of the members and having a projecting tongue portion. A female bracket has a portion securable to the second member and means define a cavity for accepting the projecting tongue. Cooperating means on the male and female brackets define a positive limit stop positively establishing a fixed limit to separating movement to the brackets. Resilient means comprising at least one resilient portion of one of the brackets adapted to be engaged and deflected by the other of the brackets are effective when the brackets are engaged for continuously exerting a resilient force in a direction to separate the brackets and continuously force the brackets apart to the limit position.

Another feature of this invention is adapted to be embodied in a bracket for use in affixing a pair of members together. The bracket comprises a mounting portion adapted to be affixed to one of the members, a locating surface formed on the bracket for engaging a cooperating locating surface on the member for accurately locating the bracket relative to the one member and connecting means on the bracket for interengaging means on another bracket fixed to another member for affixing the two members together.

BRIEF DESCRIPTION OF THE DRAWINGS

FIG. 3 is a view, in part similar to FIG. 2, showing the parts in an exploded condition.

FIG. 4 is a top plan view of the male bracket.

FIG. 5 is an enlarged cross-sectional view taken along the line 5—5 of FIG. 4.

FIG. 6 is a top plan view of the female bracket.

FIG. 7 is an enlarged cross-sectional view taken along the line 7—7 of FIG. 6.

DETAILED DESCRIPTION OF THE PREFERRED EMBODIMENT

Figure 1:
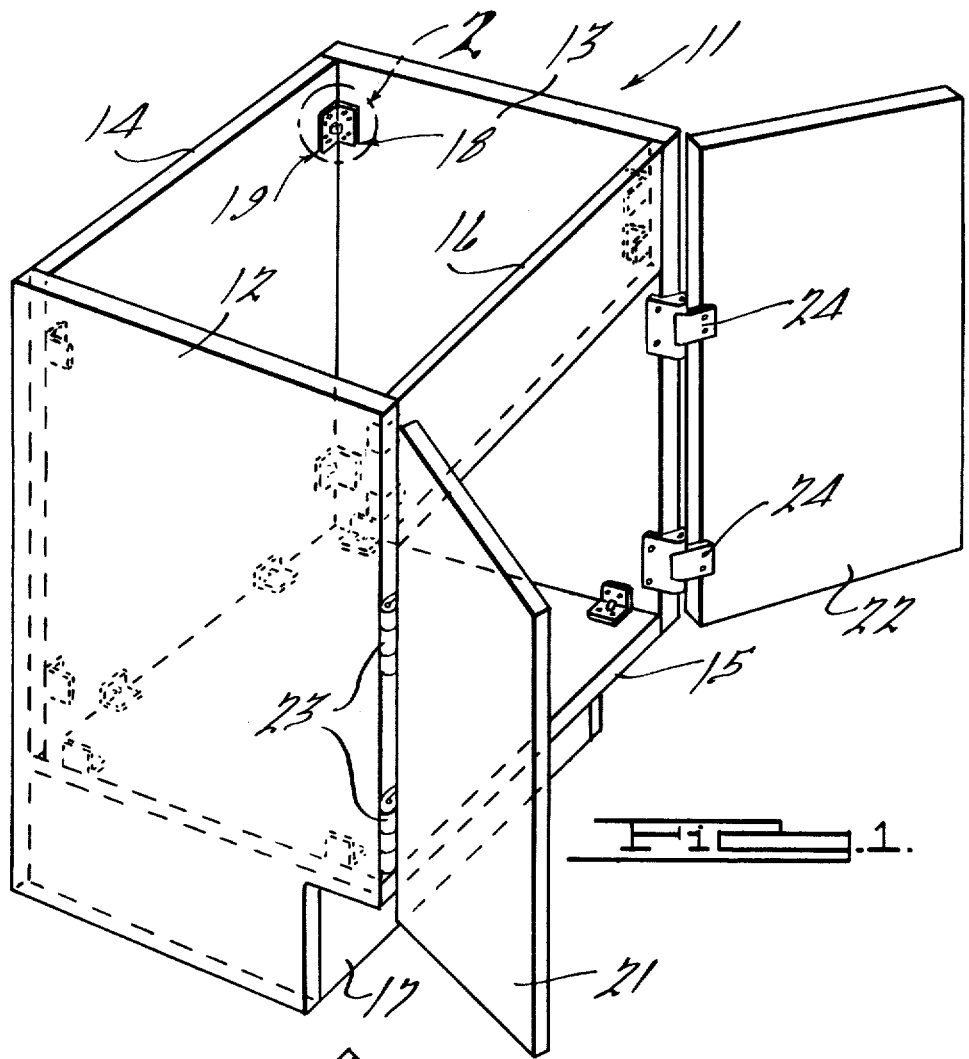
FIG. 1 is a perspective view of a knockdown cabinet embodying this invention.
Figure 2:
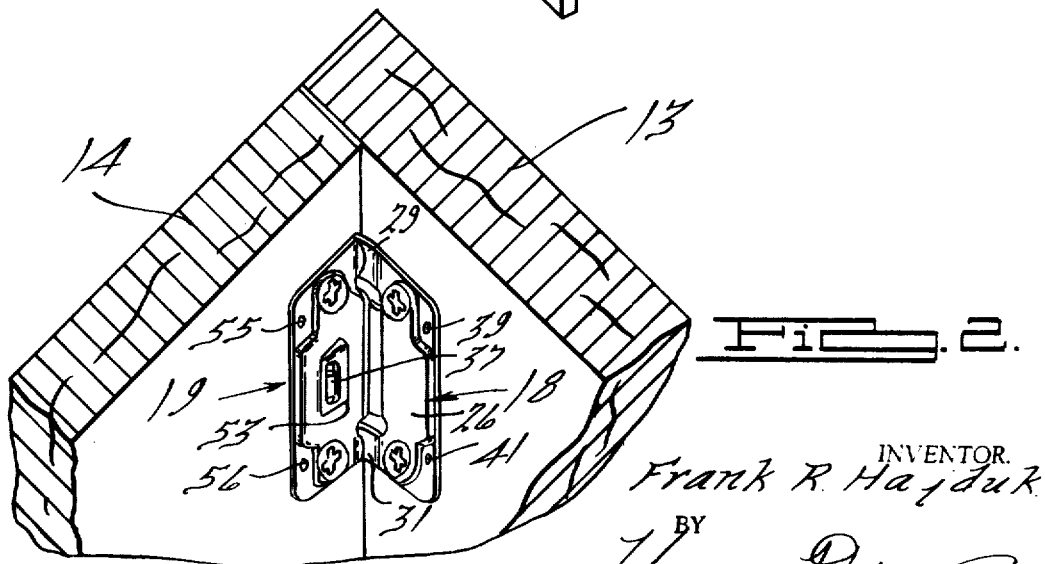
FIG. 2 is an enlarged view of the area encompassed in the circle 2 in FIG 1 and shows the connecting brackets in an interengaged position.

Referring first to FIG. 1, a knockdown cabinet assembly embodying the invention is identified generally by the reference numeral 11. It is to be understood that, although the invention is described in conjunction with a knockdown cabinet, certain features of the invention are susceptible for use in other applications. The invention has particularly utility, however, in conjunction with the assembly of knockdown or prefabricated components.

Referring now specifically to FIG. 1, the cabinet 11 includes a pair of parallel side walls 12 and 13, a rear wall 14, a bottom shelf 15, a top panel 16 and a toe board 17. The members 12 through 17 may be made from wood, composition board or any other suitable, relatively rigid material. These members are secured together by means of a plurality of male brackets, indicated generally by the reference numeral 18 and cooperating female brackets, indicated generally by 19. A pair of doors 21 and 22 are supported by pairs of hinges 23 and 24, respectively, for pivotally supporting the doors 21 and 22 relative to the side walls 12 and 13.

The brackets 18 and 19 and the manner of connecting the various members together will now be described in particular reference to the remaining figures. These figures disclose the method of attachment of the side wall 13 to the rear wall 14. It is to be understood that this attachment method and construction is typical of the joints between any two of the members and may be used to attach any two members of any other type of prefabricated component. Each of the brackets 18 and 19 is formed from sheet metal by a plurality of press operations. The brackets 18 and 19 are accurately located with respect to the structural members and are affixed to these members, either on the site or at the point where the prefabricated assembly is made in a manner which will become more apparent as this description proceeds.

The male bracket 18 (FIGS. 4 and 5) is comprised of a generally planar mounting portion 25 having a central embossment 26 in which a pair of spaced apertures 27 and 28 are formed. The apertures 27 and 28 have a generally countersunk configuration as clearly shown in FIG. 5. At opposite peripheral edges of the mounting portion 25, resilient fingers or tangs 29 and 31 are formed. The fingers 29 and 31 extend upwardly relative to the mounting portion 25 and are curved about a radius, indicated at 32 in FIG. 5 and which is exaggerated for the sake of illustration. Edges 33 and 34 are formed at the outer end of the tangs 29 and 31, for a reason which will become more apparent as this description proceeds.

A tapered tongue 35 extends outwardly from the mounting portion 25 and between the fingers 29 and 31. The tongue 35 extends perpendicularly to the mounting portion 25. A central opening 36 is formed in the tongue 35 and a reversely joined tang 37 extends outwardly of the opening 36. The tang 37 is curved about a radius, indicated by the line 38 in FIG. 5.

A pair of locating embossments 39 and 41 are formed on the mounting portion 25 at a distance from each other indicated by the dimension 42. The embossments extend from the mounting portion 25 in a direction opposite to the tongue 35.

Referring now primarily to FIGS. 6 and 7, the female bracket 19 is comprised of a generally planar mounting section 44. An embossed central portion 45 defines a pair of countersunk openings 46 and 47. At the forward edge of the mounting portion 44 the embossment 45 is formed with an upwardly tapered portion 48 that forms an opening 49 that is adapted to receive the tongue 35, as will become more apparent as this description proceeds. On either side of the opening 49, the mounting portion 44 is formed with generally hemispherical embossments 51 and 52.

The center of the portion 45 is formed with a second embossment 53 having a generally tapered shape. The embossment 53 is apertured as at 54.

A pair of locating embossments 55 and 56 are formed on the mounting portion 44 on opposite sides of the embossment 45. Locating embossments 55 and 56 are spaced apart at a distance 57 and extend from the mounting portion 44 in a direction opposite to the embossment 45.

As has been previously noted, the cabinet assembly 11 is adapted to be shipped in a knocked down fashion. In this way, the members 12 through 17 and doors 21 and 22 may be conveniently stacked, one upon the other, and packaged. The necessary number of brackets 18 and 19 and hinges 23 and 24 may be packaged separately. On the site, the brackets 18 and 19 are first affixed to the respective members. Due to the manner of attachment of the brackets 18 and 19 to each other, it is extremely important that these brackets be accurately located with respect to the member to which they are to be attached. In order to insure this accurate location, preformed locating openings are formed in the members to receive the locating embossments 39 and 41 or 55 and 56 of the respective brackets 18 and 19. FIG. 3 depicts the manner and form of these locating openings. In this figure, the side panel 13 is adapted to receive a male bracket 18. Thus, at the appropriate location a pair of locating holes 58 and 59 are formed in the inner surface of the panel 13. The openings 58 and 59 are spaced apart a distance equal to the distance 42 and are spaced at a distance from the edge of the panel 13 as required to complete the assembly. In a like manner, locating openings 61 and 62 are formed in the member 14 at a distance from each other equal to the distance 57. The openings 61 and 62 are formed at an appropriate distance from the edge of the panel 14. It should be noted that the distance 42 is different from the distance 57 so that reversal of the brackets 18 and 19 is precluded. When the cabinet 11 is to be assembled, the embossments 39 and 41 of the male bracket 18 are inserted into the openings 58 and 59. The bracket 18 will then be accurately located with respect to the panel 13. Screws are then inserted through the countersunk openings 27 and 28 to affix the bracket 18 to the panel 13. If desired, when the panel 13 is formed with the openings 58 and 59, smaller openings may be formed adjacent the place where the apertures 27 and 28 will register for receiving and starting the screws. The female bracket 19 is located relative to the panel 14 and is attached to it in a manner similar to that already described.

When the necessary brackets are fixed to the respective members, the members are attached together using these brackets. This is done by inserting the tongues 35 into the openings 49. The tongues 35 are inserted into these openings until the tangs 37 register with and snap into the openings 54. At this time, disassembly will be precluded. The resilient curved fingers or tangs 29 and 31 will contact the embossments 51 and 52 and tend to urge the bracket 18 away from the bracket 19. This will force an edge 63 of the tang 37 into firm engagement with the aperture 54 and prevent disassembly. If it is desired to disassemble the cabinet, a screwdriver or suitable tool is inserted through the aperture 54 to depress the curved tang 37. The tank 37 is depressed sufficiently so as to clear the aperture 54 and permit the tongue 35 to be withdrawn. Since the tangs 29, 31 and 37 are curved rather than being straight as in the aforenoted patent, they will retain their resilience and will not be permanently deformed. They may, therefore, be reused several times, if necessary. Also, since the brackets 18 and 19 are positively and accurately located, the finished cabinet assembly will have neat and tight joints.

What is claimed is:

1. Bracket means for interconnecting in preselected interrelationship first and second members constituting elements of a prefabricated cabinet or the like comprising a male bracket element having a first portion securable to one of said members and having a projecting tongue portion, a female bracket element having a portion securable to the second member and means defining a cavity accepting said projecting tongue, locking means including cooperating means on said male and female bracket elements defining a positive limit stop positively establishing a fixed limit to separating movement of said male and female bracket elements, and resilient means comprising at least one resilient portion on one of said bracket elements said resilient portion being curved about an axis transverse to the direction of separating movement, the other of said bracket elements having a portion disposed parallel to said axis, said curved, resilient portion being adapted to be engaged and deflected relative to its axis of curvature by said portion of said other of said bracket elements when said male and female bracket elements are engaged for continuously exerting a resilient force in a direction to separate said male and female bracket elements and continuously biasing said male and female bracket elements apart to said limit position.

2. Bracket means as set forth in claim 1 in which the resilient means comprises a pair of curved resilient portions on the male bracket, said curved resilient portions being positioned on opposite sides of the tongue.

3. Bracket means as set forth in claim 2 wherein the curved resilient portions of the male bracket engage curved edges of the female bracket.

4. Bracket means as set forth in claim 1 wherein each of the bracket elements is formed with locating surfaces, said surfaces being interengaged with corresponding locating surfaces of the members for locating the bracket elements with respect to said members.

5. Bracket means as set forth in claim 4 wherein the locating surfaces of the bracket elements comprise pairs of spaced surfaces, the pairs of locating surfaces of the male bracket element being spaced apart a different distance from the pair of locating surfaces of the female bracket element.

* * * * *